(12) United States Patent
Walker

(10) Patent No.: US 9,262,322 B2
(45) Date of Patent: Feb. 16, 2016

(54) METHOD AND APPARATUS FOR STORING A PROCESSOR ARCHITECTURAL STATE IN CACHE MEMORY

(71) Applicant: Advanced Micro Devices, Inc., Sunnyvale, CA (US)

(72) Inventor: William L. Walker, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 218 days.

(21) Appl. No.: 14/028,731

(22) Filed: Sep. 17, 2013

(65) Prior Publication Data

US 2015/0081980 A1    Mar. 19, 2015

(51) Int. Cl.
| | |
|---|---|
| *G06F 12/08* | (2006.01) |
| *G06F 11/07* | (2006.01) |
| *G06F 9/44* | (2006.01) |

(52) U.S. Cl.
CPC .............. *G06F 12/0802* (2013.01); *G06F 9/44* (2013.01); *G06F 11/073* (2013.01); *G06F 11/0721* (2013.01); *G06F 12/0877* (2013.01)

(58) Field of Classification Search
CPC ... G06F 11/07; G06F 11/0721; G06F 11/073; G06F 11/1402; G06F 11/1438; G06F 11/1441; G06F 12/0808; G06F 12/0877; G06F 12/0897; G06F 2015/765
See application file for complete search history.

(56) References Cited

U.S. PATENT DOCUMENTS

| | | | | |
|---|---|---|---|---|
| 2003/0204760 | A1* | 10/2003 | Youngs ......................... | 713/320 |
| 2007/0157036 | A1* | 7/2007 | Jahagirdar et al. ............ | 713/300 |
| 2009/0235099 | A1* | 9/2009 | Branover et al. ............. | 713/322 |
| 2010/0235579 | A1* | 9/2010 | Biles et al. .................... | 711/125 |
| 2012/0210155 | A1* | 8/2012 | Fleischmann et al. ........ | 713/324 |
| 2014/0108734 | A1* | 4/2014 | Kitchin et al. ................ | 711/122 |

OTHER PUBLICATIONS

U.S. Appl. No. 13/653,744, filed Oct. 17, 2012, entitled "Method and Apparatus for Saving Processor Architectural State in Cache Hierarchy".

* cited by examiner

*Primary Examiner* — Hal Schnee (57) ABSTRACT

A method includes storing architectural state data associated with a processing unit in a cache memory using an allocate without fill mode. A system includes a processing unit, a cache memory, and a cache controller. The cache controller is to receive architectural state data associated with the processing unit and store at least a first portion of the architectural state data in the cache memory using a first fill mode responsive to a first value of a fill mode flag and store at least a second portion of the architectural state data in the cache memory using a second fill mode responsive to a second value of a fill mode flag, wherein the first fill mode differs from the second fill mode with respect to whether previous values of the architectural state data are retrieved prior to storing the first or second portions in the cache memory.

19 Claims, 10 Drawing Sheets

METHOD AND APPARATUS FOR STORING A PROCESSOR ARCHITECTURAL STATE IN CACHE MEMORY

BACKGROUND

1. Field of the Disclosure

The disclosed subject matter relates generally to electronic devices having multiple power states and, more particularly, to a method and apparatus for storing an architectural state of a processor in cache memory.

2. Description of the Related Art

Some processors may include multiple central processing unit (CPU) cores and one or more secondary processor cores, such as a graphics processing unit (GPU) cores. To save system power, one or more of these cores can be powered off when not being utilized. For example, a processor core may be powered down when the processing load is light. When the load subsequently increases and the system again requires the use of that processor core, it will power up the processor core and resume executing instructions on that processor core. When a processor core is powered off, the architectural state of that processor core is lost. When the processor core is powered up again, it will require that architectural state be re-established to continue executing instructions. To avoid running lengthy boot code to restore the processor core back to an initialized state, a processor core may save its architectural state before being powered off and then restore that architectural state when being powered up. The processor core stores the architectural state in a location that will retain power across the processor core powered-down period.

This process of saving and restoring architectural state is time-critical for the system. Any time wasted before going into the powered-down state is time that the core could have been already powered down. Reducing the time required for an architectural state save results in increased power savings. Also, any time wasted while restoring the architectural state on power-up adds to the latency in re-establishing the operational state of the processor core, thereby reducing system performance.

The memory location where the architectural state is saved while the processor core is in a low power state must be secure. If a hardware or software entity could maliciously corrupt this architectural state when the processor core is in a low power state, the processor core would restore a corrupted state and could be exposed to a security risk. Conventional processors save the architectural state to various locations to facilitate a lower power state. For example, the processor may save the architectural state to a dedicated static random access memory ("SRAM") array or to the system memory ((e.g., dynamic random access memory ("DRAM")). The use of dedicated SRAM allows faster save and restore times and improved security, but requires additional hardware, resulting in increased cost. Saving the architectural state to system memory uses existing memory infrastructure, but increases save and restore times and decreases security as compared to the use of dedicated SRAM.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-10 illustrate example techniques for saving an architectural state of a processor core in a cache memory prior to powering down the processor core so that the architectural state may be recovered when power is restored to the processor core. During the architectural state save, some or all of the cache lines targeted by the architectural state data may not be present in the cache. In a conventional cache write, a line not in the cache must first be retrieved from the memory subsystem and loaded into the cache prior to allocating the cache line and allowing the data being written by the processor core (this process referred to herein as a "cache line fill"). In the case of architectural state data, the previous values of the cache lines are unimportant, as they will be overwritten. To reduce the time associated with the storage of the architectural state data, the cache may operate in a mode that suppresses the cache line fill and instead writes the cache line with zeros, or some other predetermined value, prior to allocating the cache line, a mode referred to herein as an "allocate without fill" mode. In a case where a cache line write is interrupted during the storage of the architectural state data, the processor core suspends the allocate without fill mode for the remainder of the architectural state storage operation, and instead employs a conventional allocate with fill mode, where the previous values of the targeted cache lines are retrieved from the memory hierarchy prior to allowing further architectural state data to be stored, thereby ensuring that any partial data written to the cache line prior to the interruption is preserved. Using the allocate without fill mode reduces the time required to implement the storage of the architectural state data, thereby increasing the length of the time interval that the processing unit 110, 115 can reside in a powered-down state. Such an increased time spent in a powered-down state can, in certain circumstances, result in systems (e.g., battery powered devices such as laptops, tablets, handsets and other mobile devices) having increased battery longevity.

Figure 1:
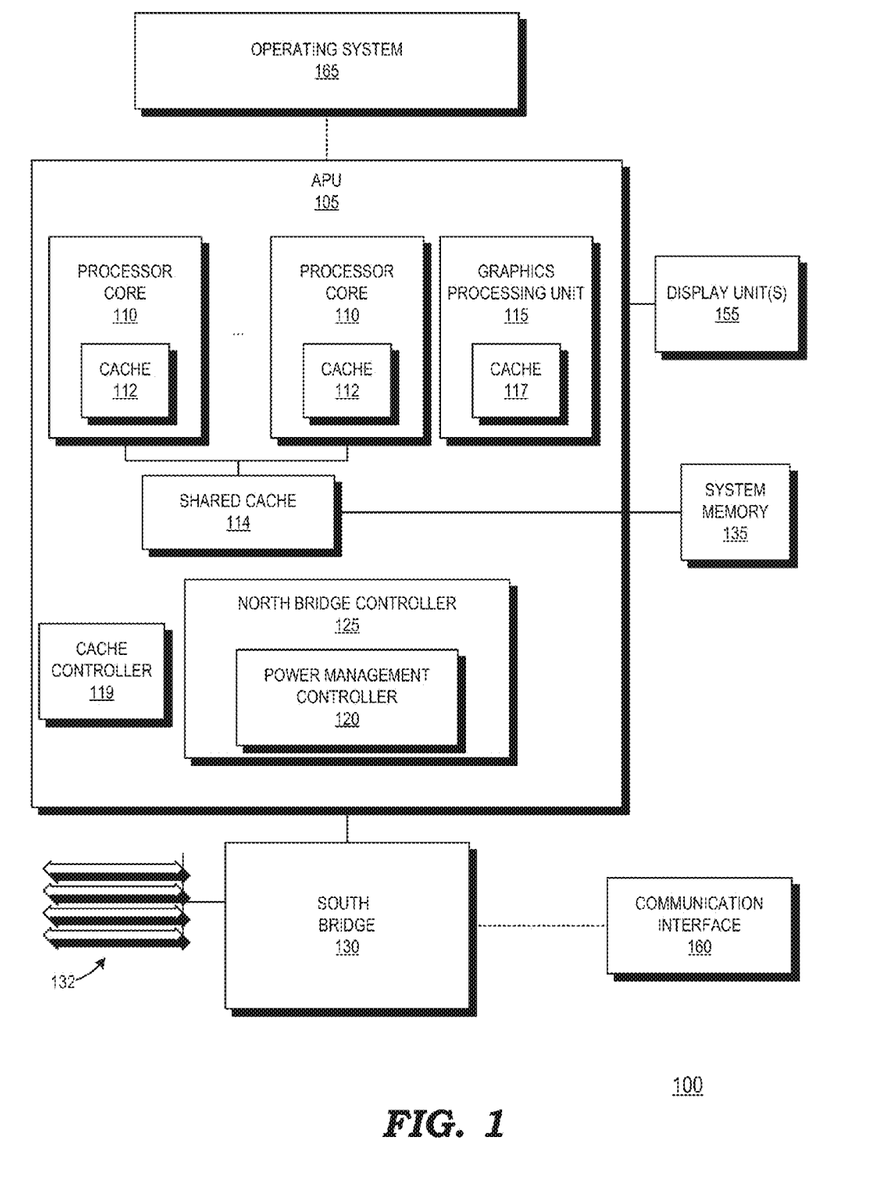
FIG. 1 is a block diagram of a computer system configured to store architectural processor states in a cache memory, in accordance with some embodiments.

FIG. 1 illustrates a computer system 100 including an accelerated processing unit ("APU") 105 that saves architectural state data in a cache memory of the memory hierarchy in accordance with some embodiments. The APU 105 includes one or more processor cores 110 and their associated caches, such as a Level 1 ("L1") cache 112 and a shared Level 2 ("L2") cache 114, a graphics processing unit ("GPU") 115 and its associated cache 117, at least one cache controller 119, a power management controller 120, a north bridge ("NB")

controller 125. The processor cores 110 and GPU 115 may be collectively referred to as processing units 110, 115. The architectural state data for processing unit 110, 115 may include, for example, the values stored in the registers and memory of the processing unit 110, 115. The system 100 also includes a south bridge ("SB") 130, and system memory 135 (e.g., DRAM). The NB controller 125 provides an interface to the south bridge 130 and to the system memory 135. To the extent certain exemplary aspects of the processing units 110, 115 or one or more cache memories 112, 114, 117 are not described herein, such exemplary aspects may or may not be included in various embodiments without limiting the spirit and scope of the embodiments of the present subject matter as would be understood by one of skill in the art. In some embodiments, the computer system 100 may interface with one or more peripheral devices, input devices, output devices, and/or display units via the south bridge 130. The operation of the system 100 is generally controlled by a software operating system 165. In various embodiments, the computer system 100 may be a personal computer, a laptop computer, a hand-held computer, a tablet computer, a mobile device, a telephone, a personal data assistant ("PDA"), a server, a mainframe, a work terminal, a music player, a smart television, a game console, and the like.

The power management controller 120 may be a circuit or logic configured to perform one or more functions in support of the computer system 100. As illustrated in FIG. 1, the power management controller 120 is implemented in the NB controller 125, which may include a circuit (or sub-circuit) configured to perform power management control as one of the functions of the overall functionality of NB controller 125. In some embodiments, the south bridge 130 controls a plurality of voltage rails 132 for providing power to various portions of the system 100. The separate voltage rails 132 allow some elements to be placed into a sleep state while others remain powered. For example, one or more of the processor cores 110 may be placed into a sleep state, where they may save their architectural states in their respective caches 112, 114, 117 prior to powering down.

In some embodiments, the circuit represented by the NB controller 125 is implemented as a distributed circuit, in which respective portions of the distributed circuit are configured in one or more of the elements of the system 100, such as the processor cores 110, but operating on separate voltage rails 132, that is, using a different power supply than the section or sections of the processor cores 110 functionally distinct from the portion or portions of the distributed circuit. The separate voltage rails 132 may thereby enable each respective portion of the distributed circuit to perform its functions even when the rest of the processor core 110 or other element of the system 100 is in a reduced power state. This power independence enables embodiments that feature a distributed circuit, distributed controller, or distributed control circuit performing at least some or all of the functions performed by NB controller 125 shown in FIG. 1. In some embodiments, the power management controller 120 controls the power states of the various processing units 110, 115 in the computer system 100.

Instructions of different software programs are typically stored on a relatively large but slow non-volatile storage unit (e.g., internal or external disk drive unit). When a user selects one of the programs for execution, the instructions of the selected program are copied into the system memory 135, and the APU 105 obtains the instructions of the selected program from the system memory 135. Some portions of the data are also loaded into L1 cache memories 112 of one or more of the processor cores 110, the cache memory 117 of the GPU 115, and/or the shared L2 cache 114. As described in greater detail below, the processor cores 110 and/or the GPU 115 may employ a hierarchy of cache memory elements and may include additional cache levels, such as a level 3 (L3) cache.

The caches 112, 114, 117 are smaller and faster memories (i.e., as compared to the system memory 135) that store copies of instructions and/or data that are expected to be used relatively frequently during normal operation. Instructions or data that are expected to be used by a processing unit 110, 115 during normal operation are moved from the relatively large and slow system memory 135 into the caches 112, 114, 117 by the cache controller 119. Although the cache controller 119 is illustrated as a single unit, in some embodiments, the cache controller 119 may be distributed to provide separate cache management for each of the caches 112, 114, 117. When a processing unit 110, 115 needs to read or write a location in the system memory 135 for a conventional memory operation, the cache controller 119 first checks to see whether the desired memory location is included in one of the caches 112, 114, 117. If this location is included in a cache 112, 114, 117 (i.e., a cache hit), then the processing unit 110, 115 can perform the read or write operation on the copy in the cache 112, 114, 117. If this location is not included in the cache 112, 114, 117 (i.e., a cache miss), then the processing unit 110, 115 needs to access the information stored in the system memory 135 and, in some cases, the information may be copied from the system memory 135 cache controller 119 and added to the cache 112, 114, 117. Proper configuration and operation of the cache 112, 114, 117 can reduce the latency of memory accesses.

As described in greater detail below with respect to FIGS. 8 and 9, in cases where a processing unit 110, 115 is storing architectural state data in its associated cache 112, 117, the cache controller 119 may operate in an allocate without fill mode to reduce the time required for the store operation. In this manner, the data need not be filled from the L2 cache 114 or a lower level of the memory hierarchy to facilitate the storage of the architectural state data. In the event, the storage of the architectural state data is interrupted after a particular cache line is partially written, the cache controller 119 may transition to a conventional allocate with fill mode to preserve the partially written architectural state data.

Figure 2:
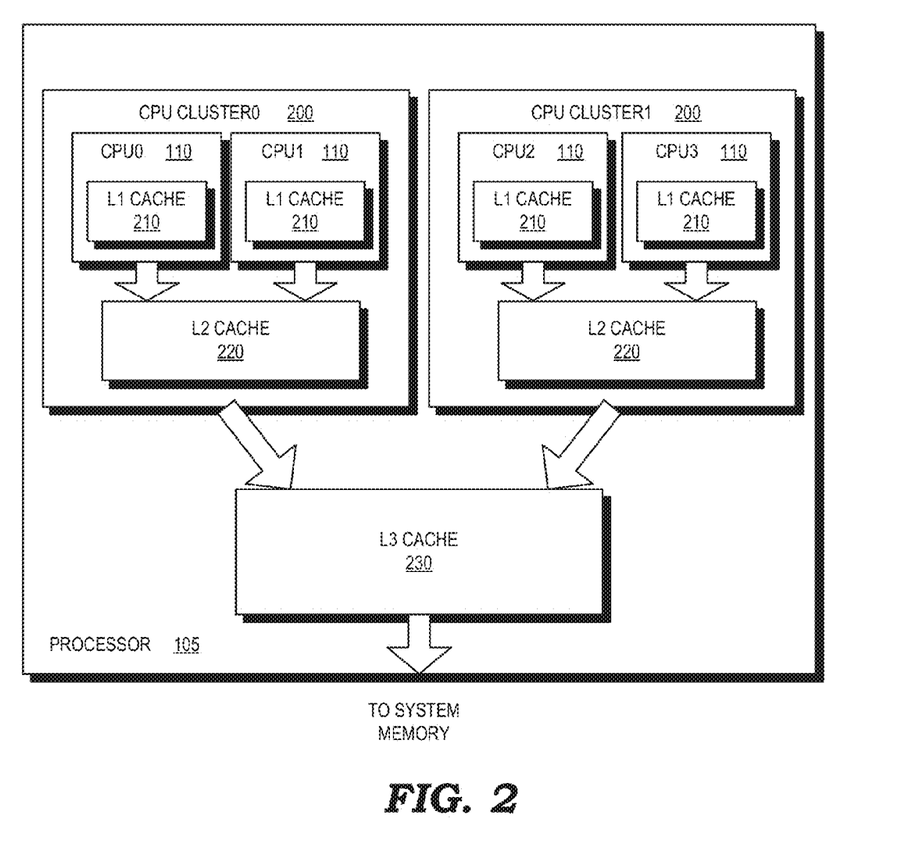
FIG. 2 is a simplified diagram of a memory hierarchy implemented by the system of FIG. 1, in accordance with some embodiments.

FIG. 2 is a block diagram illustrating a memory hierarchy employed by the APU 105 in accordance with some embodiments. The APU 105 employs a hierarchical cache that divides the cache into three levels known as L1, L2, and L3. For ease of illustration, the GPU 115 and its cache 117 are not illustrated in the memory hierarchy, but the techniques described herein may also be applied to the GPU 115. The processor cores 110 are grouped into CPU clusters 200. Each processor core 110 has its own L1 cache 210, each cluster 200 has an associated L2 cache 220, and the clusters 200 share an L3 cache 230. The system memory 135 is in the memory hierarchy downstream of the L3 cache 230. In the memory hierarchy, the speed generally decreases with level, but the size generally increases. For example, the L1 cache 210 is typically smaller and faster than the L2 cache 220, which is smaller and faster than the L3 cache 230. The largest level in the memory hierarchy is the system memory 135, which is also slower than the cache memories 210, 220, 230. A particular processor core 110 first attempts to locate needed memory locations in the L1 cache and then proceeds to look successively in the L2 cache, the L3 cache, and finally the system memory 135 when it is unable to find the memory location in the upper levels of the cache. The cache controller 119 may be a centralized unit that manages all of the cache memories in the memory hierarchy, or it may be distributed.

For example, each cache 210, 220, 230 may have its own cache controller 119, or some levels may share a common cache controller 119.

In some cases, the L1 cache 210 may be subdivided into a separate L1-I instruction cache for storing instructions and an L1-D data cache for storing data. The L1-I cache can be placed near entities that require more frequent access to instructions than data, whereas the L1-D cache can be placed closer to entities that require more frequent access to data than instructions. The L2 cache 220 is typically associated with both the L1-I and L1-D caches and can store copies of instructions or data retrieved from the L3 cache 230 and the system memory 135. Frequently used instructions are copied from the L2 cache into the L1-I cache and frequently used data can be copied from the L2 cache into the L1-D cache. The L2 and L3 caches 220, 230 are may be referred to as unified caches in that they store both instructions and data.

In some embodiments, the power management controller 120 controls the power states of the processor cores 110. When a particular processor core 110 is placed in a powered-down state (e.g., a C6 state), the core processor 110 saves its architectural state in its L1 cache 210 responsive to a power down signal from the power management controller 120. In embodiments where the L1 cache 210 includes an L1-I cache and an L1-D cache, the L1-D cache may be used for storing the architectural state. In this manner, the system 100 uses the cache memories 210, 220, 230 to facilitate the architectural state save/restore for power events. When the processor core 110 is powered down, the cache contents are automatically flushed to the next lower level in the memory hierarchy by the cache controller 119. In some embodiments, each core has a designated memory location for storing its architectural state. When the particular processor core 110 receives a power restore instruction or signal to exit from the sleep state, it retrieves its architectural state based on the designated memory location. Based on the designated memory location, the memory hierarchy will locate the architectural state data in the lowest level that the data was flushed down to in response to power down events. If the power down event is canceled by the power management controller 120 prior to flushing the L1 cache 210, the architectural state may be retrieved therefrom.

Figure 3:
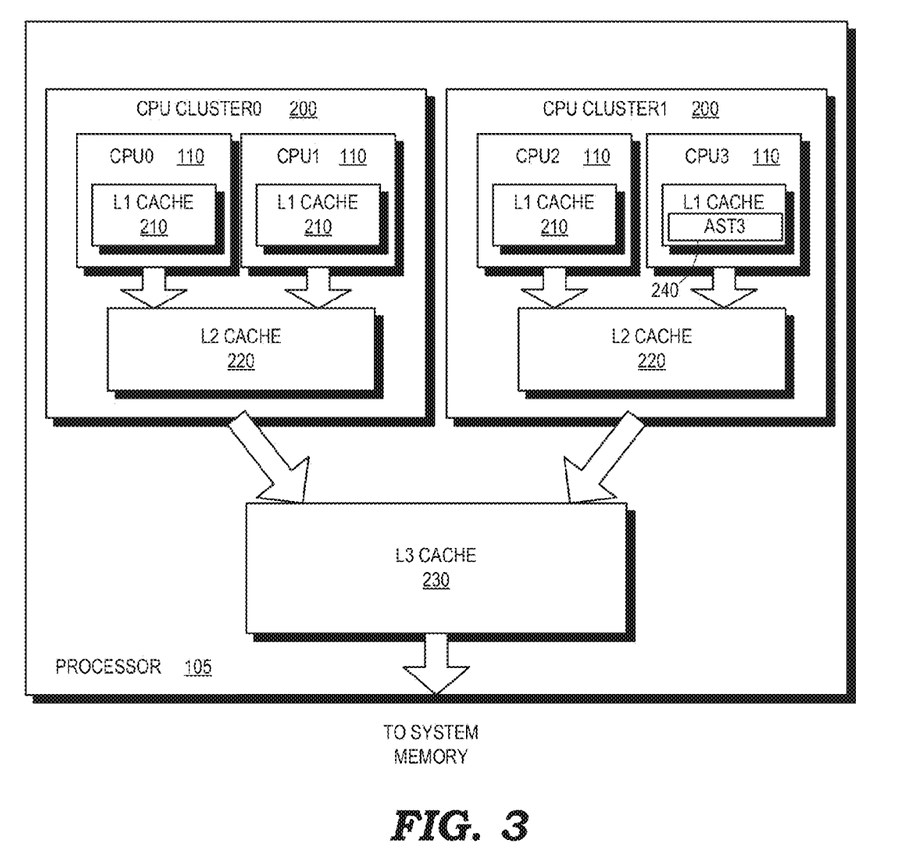
FIGS. 3-7 illustrate the use of the cache memory to store processor architectural states during power down events, in accordance with some embodiments.
Figure 4:
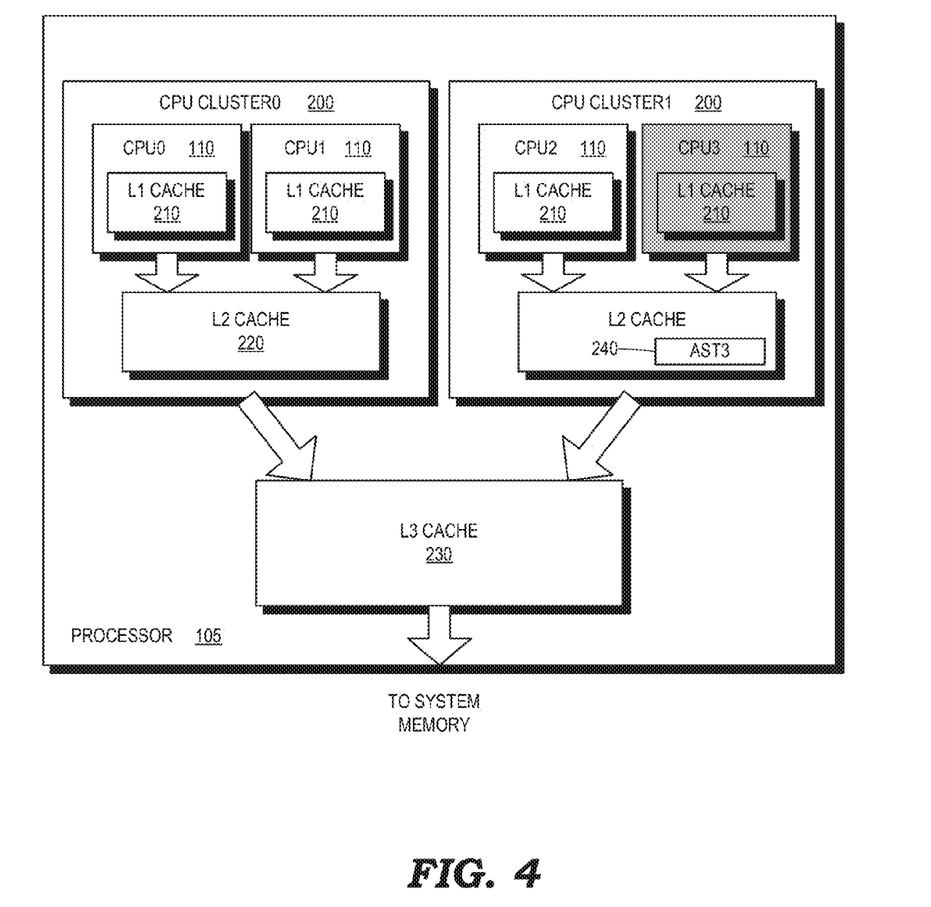

FIGS. 3-7 illustrate the use of cache memories in the memory hierarchy to store processor architectural states during power down events, in accordance with some embodiments. As shown in FIG. 3, the power management controller 120 instructs CPU3 to transition to a low power state. CPU3 stores its architectural state 240 (AST3) in its L1 cache 210. The technique used by the processor cores 110 to save their architectural states in the L1 cache 210 is described in greater detail below in reference to FIG. 8. In general, the cache controller 119 employs an allocate without fill mode to reduce latency for the architectural state save, and transitions to a fill mode if the architectural state save is interrupted. When CPU3 is powered down, its L1 cache 210 is flushed by the cache controller 119 to the L2 cache 220 for the CPU cluster 1, as shown in FIG. 4. The powering down of CPU3 is denoted by the gray shading.

Figure 5:
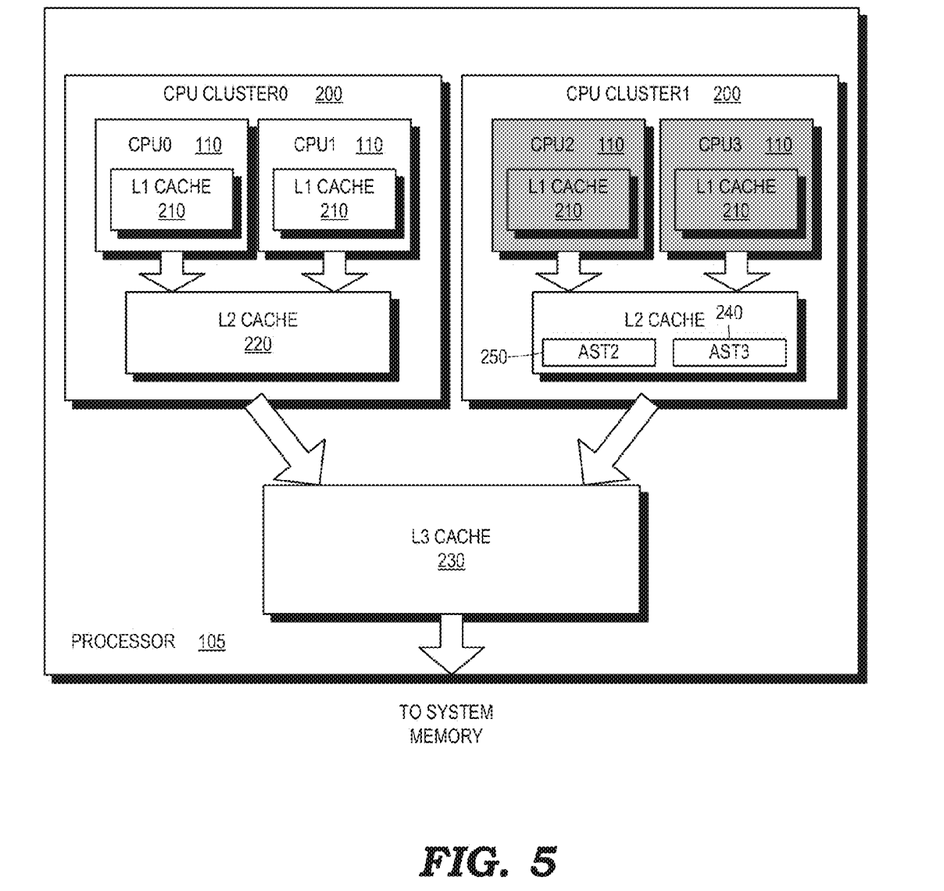
Figure 6:
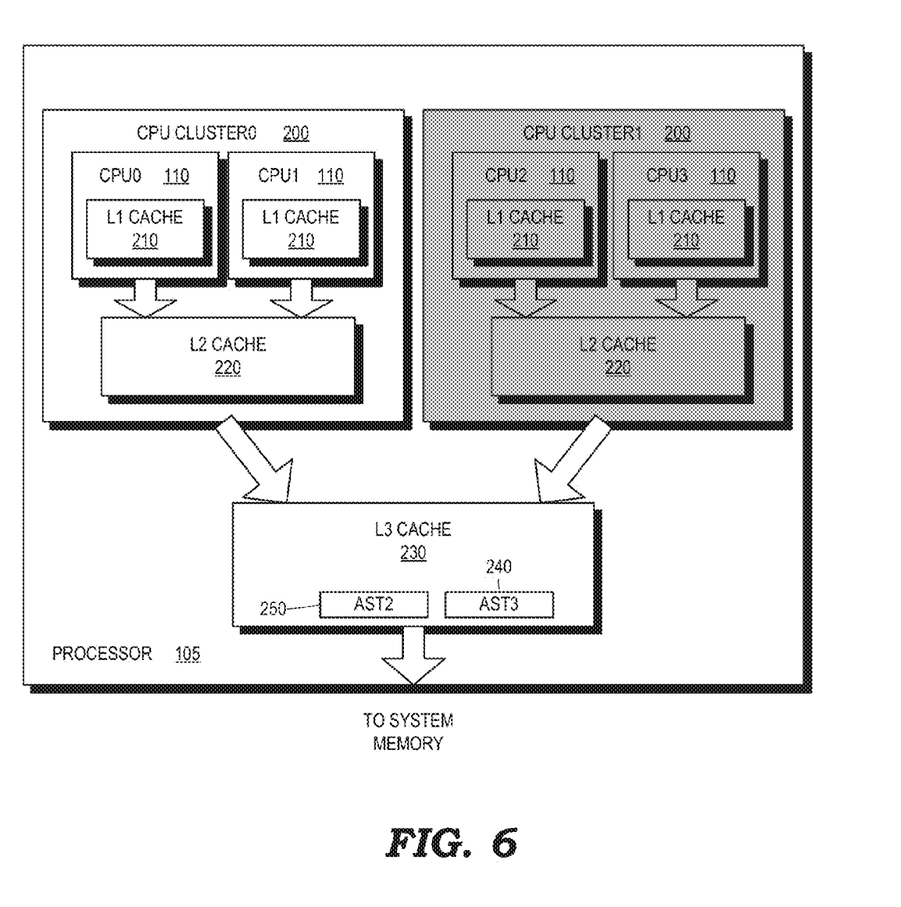

As shown in FIG. 5, CPU2 is also instructed to power down by the power management controller 120, and CPU2 stores its architectural state 250 (AST2) in its L1 cache 210 (not shown). CPU2 powers down and its architectural state 250 is flushed by the cache controller 119 to the L2 cache 220. Since both processor cores 110 in CPU cluster 1 are powered down, the whole cluster may be powered down, which flushes the L2 cache 220 to the L3 cache 230, thereby relocating the saved architectural states 240, 250 as shown in FIG. 6.

Figure 7:
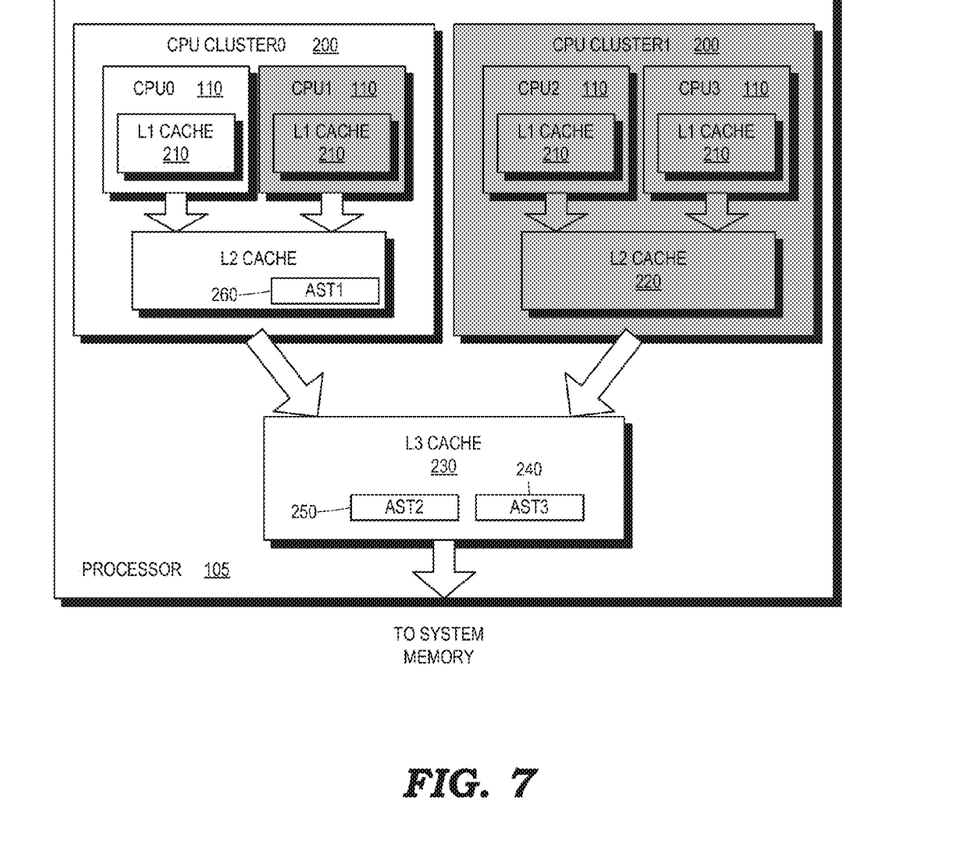

As shown in FIG. 7, CPU1 is powered down by the power management controller 120. CPU1 saves its architectural state 260 (ASTATE1) to its L1 cache 210 (not shown) and then the cache controller 119 flushes the architectural state 260 to the L2 cache 220. In this current state, only CPU0 is running, which is a common scenario for CPU systems with only one executing process.

If CPU1 were to receive a power restore instruction or signal to cause it to exit the sleep state, it would to fetch its architectural state from the CPU Cluster 0 L2 cache 220. If CPU2 or CPU3 were to power up, they would fetch their respective states from the L3 cache 230. Because the processor cores 110 use designated memory locations for their respective architectural state data, the restored processor core 110 need only request the data from the designated location. The cache controller 119 will automatically locate the cache level in which the data resides. For example, if the architectural state data is stored in the L3 cache 230, the processor core 110 being restored will get misses in the L1 cache 210 and the L2 cache 220, and eventually get a hit in the L3 cache 230. The memory hierarchy logic will identify the location of the architectural state data and forward it to the processor core 110 being restored.

If all processor cores 110 were to power down, then the L3 cache 230 would be flushed to system memory 135 and the entire APU 105 could power down. The cache controller 119 would locate the architectural state data in the system memory 135 during a power restore following misses in the higher levels of the memory hierarchy.

Figure 8:
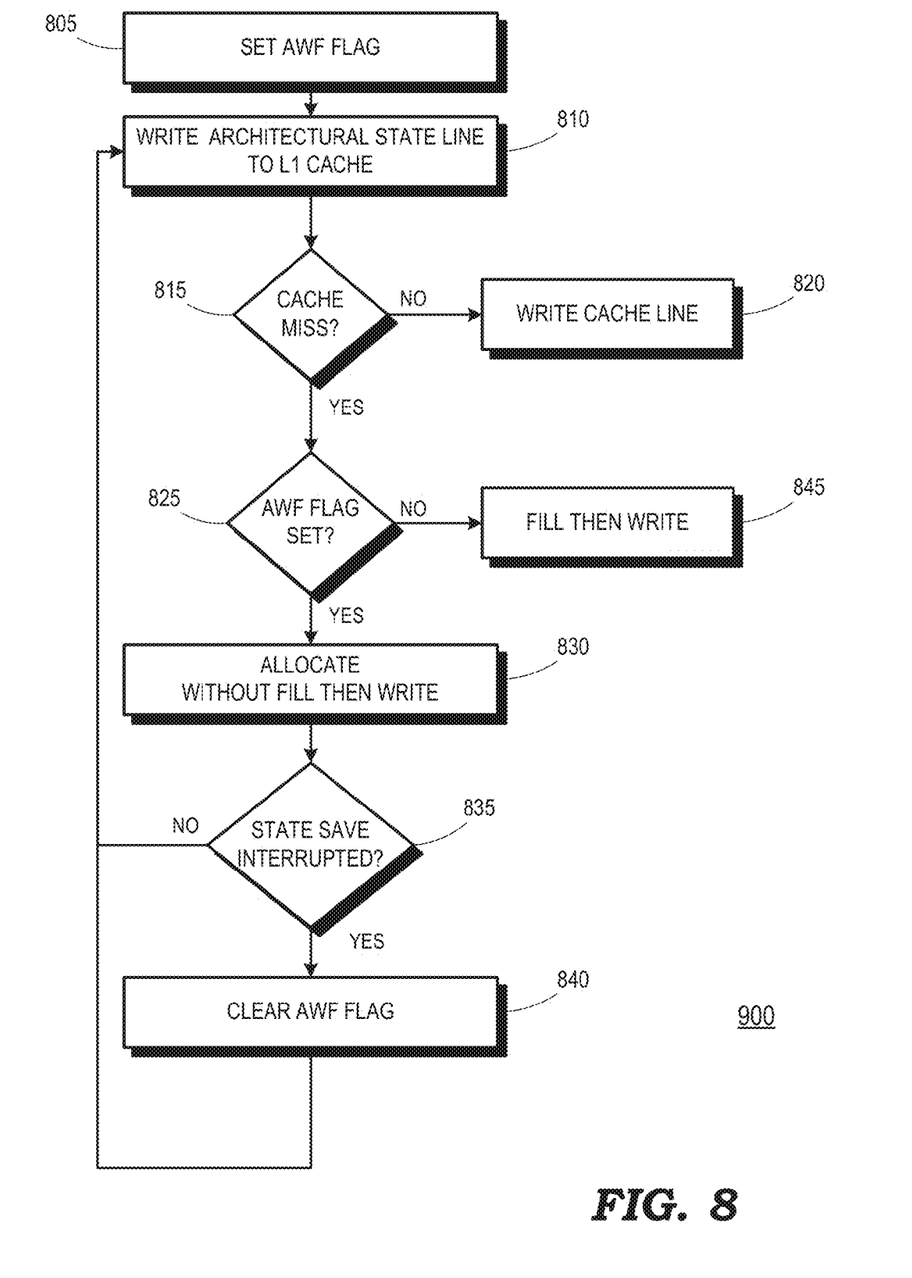
FIG. 8 is a flow diagram of method illustrating how architectural state data is stored by a processor core and an L1 cache in the memory hierarchy of FIG. 2, in accordance with some embodiments.
Figure 9:
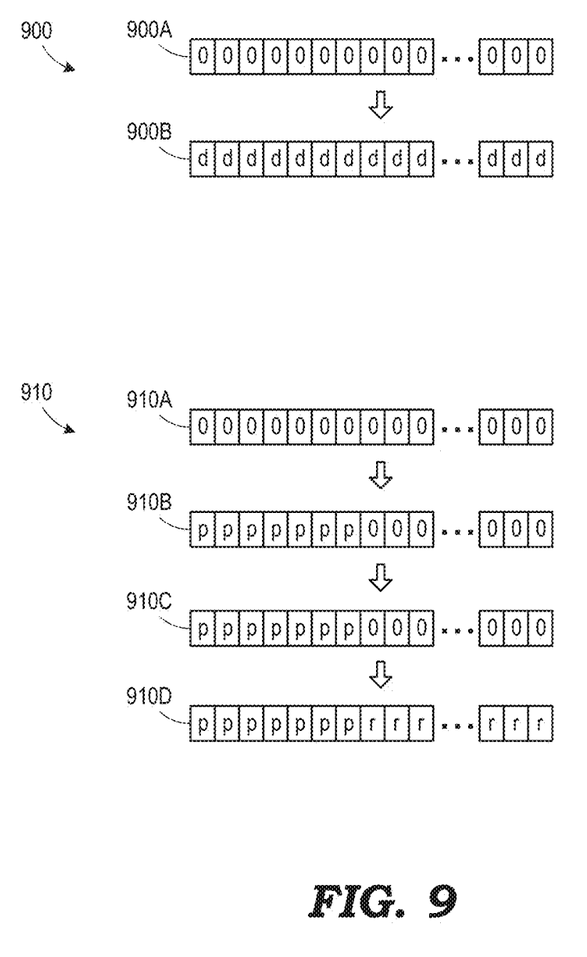
FIG. 9 is a diagram illustrating the architectural state data written during the architectural state storage operation of FIG. 9, in accordance with some embodiments.

An example architectural state save process is described in reference to FIGS. 8 and 9. FIG. 8 is a flow diagram of method 800 illustrating how architectural state data is stored by a processor core 110 and the L1 cache 210 in the memory hierarchy of FIG. 2 in accordance with some embodiments. FIG. 9 is a diagram illustrating the data written during the architectural state save process of FIG. 8 in accordance with some embodiments. The cache controller 119 employs an allocate without fill ("AWF") flag to determine which allocate mode to use for saving the architectural state data. The AWF flag is asserted when an allocate without fill mode is used and de-asserted when a conventional allocate with fill mode in used (i.e., where the previous values of the data in the cache line are retrieved from the memory hierarchy prior to allocating the cache line to allow writing of the current architectural state). The conventional fill mode is used in cases where an architectural state save is interrupted and the memory hierarchy may already store portions of the current architectural state. The cache controller 119 distinguishes between an architectural state write and a different write using the address of the write. The architectural state data is stored in a specific reserved address range. When a write request reaches the cache controller 119 from the processor core 110, its address is compared against that reserved range. If the address matches, the cache controller 119 consults the AWF flag, and if it is set, fills the corresponding cache line with zeroes (or other predetermined value) instead of reading the pervious value of the cache line from memory. If the address does not match the reserved address range, then the cache controller 119 treats the write request as a normal write and fills the cache line by reading the previous value of the cache line from the memory hierarchy.

In method block 805, an allocate without fill ("AWF") flag is set by the cache controller 119. The AWF flag may be set to enable the AWF mode after a reset, a cache flush, or upon exiting a sleep state. In these cases, the previous value of the architectural state data is irrelevant because the current architectural state is stored in the processor core 110 and would be overwritten by a subsequent architectural state save. In method block 810, the processor writes an architectural state line to the L1 cache 210. The process illustrated in method block 810 assumes that the cache controller 119 has already compared the write request to the reserved address range and has identified the write as an architectural state write. The process of method block 810 is repeated until the entire architectural state is written. In method block 815, the cache controller 119 checks the L1 cache 210 to determine if the current line is resident therein. If the cache line is present in method block 815, indicated by a cache hit, the cache line is written in method block 820. If the cache line is not present in method block 815, indicated by a cache miss, the AWF flag is checked in method block 825. If the AWF mode flag is set, the cache controller 119 implements an AWF operation and a write of the data provided by the processor core 110 in method block 830.

FIG. 9 illustrates the data operations for a cache line 900 during an AWF operation and subsequent write. Letter suffixes on the cache line reference numeral denote different versions of the cache line 900 throughout the write process. During the AWF operation, the cache line 900A is first written with zeros (or some other predetermined value). Subsequently, the cache controller 119 stores the architectural state data, "d," in the cache line 900B. Using the AWF mode reduces latency as the data need not be fetched from the memory hierarchy. The cache line 900B shows a full write of the cache line 900 without interruption. Returning to FIG. 8, in method block 835 it is determined if the state save was interrupted. Since the cache line 900 was written without interruption in method block 830 the method returns to method block 810.

The method return to block 810 for a subsequent cache line 910. Again, letter suffixes on the cache line reference numeral denote different versions of the cache line 910 throughout the write process. Assume the cache line 910 misses in method block 815. The fill mode flag is still set, in method block 825, so an AWF operation and write is commenced in method block 830. During the AWF operation, the cache line 910A is first written with zeros. Subsequently, the cache controller 119 writes the architectural state data, "p," for the current cache line 910B. However, in this example, the cache line write is interrupted, as indicated in cache line 910B by the line being partially filled with data, "p" and partially filled with zeros. For example, the cache line 910 may be the subject of a probe request by another coherent device, such as another processor core 110 or a coherent I/O device (not shown), which would interrupt the write and evict the cache line 910B from the L1 cache 210. In some embodiments, the architectural state may be saved by software (e.g., the operating system 165), rather than by microcode in the processor core 110. In such cases, a software interrupt may interrupt the architectural state save. While the interrupt is being handled, the partially-written cache line 910B could "age out" of the L1 cache 210 because the L1 cache 210 is being used to store other data (e.g., by the interrupt handler). Evicting the cache line 910B causes it to be written to a lower level in the memory hierarchy. The cache line 910B could be written to the L2 cache 220, the L3 cache 230, or the system memory 135. Regardless of the cause for the eviction of the cache line 910B, if the processor core 110 were to resume writing the architectural state data with the cache controller 119 implementing an AWF mode, the cache controller 119 would fill the cache line with zeros prior to continuing with the architectural state save. In such a case, the partial data, "p," written in the cache line 910B would be lost.

To avoid losing the partial data, the cache controller terminates AWF mode if an architectural state save is interrupted. Responsive to an interruption of the write identified in method block 835, the AWF flag is cleared in method block 840. In some embodiments, the interruption is detected when the cache controller 119 recognizes an incoming probe whose address falls in the reserved address range for architectural state saves and by identifies an outgoing cache line eviction whose address falls in the reserved address range. The method returns to method block 810 to continue with the architectural state save. At a subsequent time, when the partially written cache line 910 is released, the processor core 110 will attempt to continue writing to the cache line 910 again. Due to the previous eviction of the cache line 910B, a cache miss is encountered in method block 815. In method block 825, the AWF flag is not set, so the cache controller 119 implements a conventional fill and write in method block 845 to retrieve the cache line 910C from the memory hierarchy followed by a write of the cache line 910D, which finishes the rest of the write with the remainder data, "r".

In some embodiments, the AWF flag remains cleared for the remainder of the architectural state save, thereby avoiding the need to track the completion status of the architectural state save by cache line. The AWF flag may be set again in method block 805 after a reset, a cache flush, or upon exiting a sleep state.

For a processor system with a cache memory in the memory hierarchy, using the cache memory to save the architectural state has the benefit of low latency, since the architectural state data is only flushed as far down in the memory hierarchy as needed to support the power state. This approach also uses existing cache flushing infrastructure to save data to the caches and subsequently flush the data from one cache to the next, so the design complexity is low. The use of allocate without fill mode reduces the time required to implement an architectural state save, thereby increasing the time interval that the processor core may be powered down and saving power.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 10:
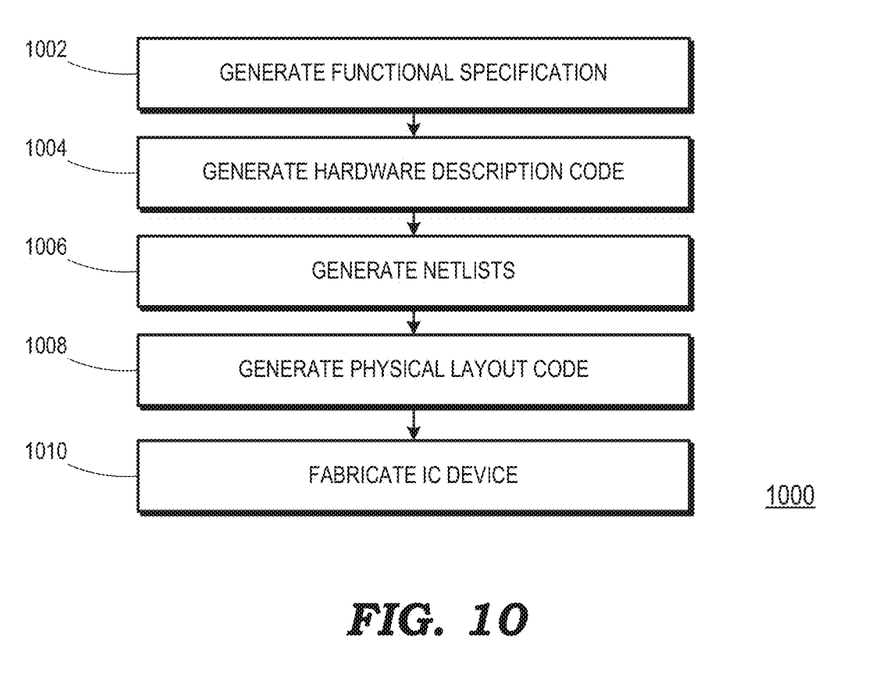
FIG. 10 is a flow diagram illustrating a method for designing and fabricating an integrated circuit device implementing at least a portion of a component of a processor, in accordance with some embodiments.

FIG. 10 is a flow diagram illustrating an example method 1000 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1004, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 1006 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes storing architectural state data associated with a processing unit in a cache memory using an allocate without fill mode.

As disclosed herein, in some embodiments a method includes storing architectural state data associated with a processing unit in a cache memory without retrieving a previous version of the architectural state data from a memory hierarchy into the cache memory.

As disclosed herein, in some embodiments a system includes a processing unit, a cache memory, and a cache controller. The cache controller is to receive architectural state data associated with the processing unit and store at least a first portion of the architectural state data in the cache memory using a first fill mode responsive to a first value of a fill mode flag and store at least a second portion of the architectural state data in the cache memory using a second fill mode responsive to a second value of a fill mode flag. The first fill mode differs from the second fill mode with respect to whether previous values of the architectural state data are retrieved prior to storing the first or second portions in the cache memory.

As disclosed herein, in some embodiments a non-transitory computer readable media stores code to adapt at least one computer system to perform a portion of a process to fabricate at least part of a system. The system includes a processing unit, a cache memory, and a cache controller. The cache controller is to receive architectural state data associated with the processing unit and store at least a first portion of the architectural state data in the cache memory using a first mode responsive to a first value of a fill mode flag and store at least a second portion of the architectural state data in the cache memory using a second mode responsive to a second value of a fill mode flag. The first fill mode differs from the second fill mode with respect to whether or not previous values of the architectural state data are retrieved prior to storing the first or second portions in the cache memory.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    storing architectural state data associated with a processing unit in a cache memory using an allocate without fill mode;
    identifying an interruption in the storing of the architectural state data; and
    resuming the storing of the architectural state data in the cache memory using an allocate with fill mode.

2. The method of claim 1, wherein storing the architectural state data using the allocate without fill mode comprises:
    allocating a first cache line in the cache memory for receiving at least a first portion of the architectural state data;
    initializing the first cache line to a predetermined value; and
    storing the first portion of the architectural state data in the first cache line.

3. The method of claim 2, wherein storing the architectural state data using the allocate with fill mode comprises:
    allocating a second cache line in the cache memory for receiving at least a second portion of the architectural state data;
    retrieving previous values of the second cache line from a memory hierarchy; and
    storing the second portion of the architectural state data in the second cache line.

4. The method of claim 1, wherein identifying the interruption further comprises identifying the interruption responsive to evicting a cache line from the cache memory storing data within a reserved address range for the architectural state data.

5. The method of claim 1, further comprising:
    flushing the architectural state data from the cache memory to a lower level of a memory hierarchy;
    placing the processing unit into a sleep state;
    exiting the processing unit from the sleep state;
    retrieving the architectural state data from the memory hierarchy; and
    restoring architectural state of the processing unit with the retrieved architectural state data.

6. A method comprising:
    storing architectural state data associated with a processing unit in a cache memory without retrieving a previous version of the architectural state data from a memory hierarchy into the cache memory;
    identifying an interruption in the storing of the architectural state data after a first portion of the architectural state data has been stored in the cache memory; and
    resuming the storing of a remainder portion of the architectural state data in the cache memory by retrieving the first portion from the memory hierarchy into the cache memory and storing the remainder portion in the cache memory after retrieving the first portion.

7. The method of claim 6, wherein identifying the interruption further comprises identifying the interruption responsive to evicting a cache line from the cache memory storing data within a reserved address range for the architectural state data.

8. The method of claim 6, wherein storing the architectural state data comprises:
    allocating a first cache line in the cache memory for receiving the first portion of the architectural state data;
    initializing the first cache line to a predetermined value; and
    storing the first portion of the architectural state data in the first cache line.

9. The method of claim 8, wherein storing the remainder portion comprises:
    allocating a second cache line in the cache memory for receiving at least a second portion of the remainder portion;
    retrieving previous values of the second cache line from the memory hierarchy; and
    storing the second portion in the second cache line.

10. The method of claim 6, further comprising:
    flushing the architectural state data from the cache memory to a lower level of the memory hierarchy;
    placing the processing unit into a sleep state;
    exiting the processing unit from the sleep state;
    retrieving the architectural state data from the memory hierarchy; and
    restoring an architectural state of the processing unit with the retrieved architectural state data.

11. A system comprising:
    a processing unit;
    a cache memory; and
    a cache controller to receive architectural state data associated with the processing unit and store at least a first portion of the architectural state data in the cache memory using a first fill mode responsive to a first value of a fill mode flag and store at least a second portion of the architectural state data in the cache memory using a second fill mode responsive to a second value of a fill mode flag, wherein the first fill mode differs from the second fill mode with respect to whether previous values of the architectural state data are retrieved prior to storing the first or second portions in the cache memory.

12. The system of claim 11, wherein the first mode comprises an allocate without fill mode and the second mode comprises an allocate with fill mode.

13. The system of claim 12, wherein the cache controller sets the fill mode flag to the second value responsive to identifying an interruption in the storing of the architectural state data.

14. The system of claim 13, wherein the cache controller identifies the interruption responsive to evicting a cache line from the cache memory storing data within a reserved address range for the architectural state data.

15. The system of claim 13, wherein the cache controller sets the fill mode flag to the first value responsive to flushing the cache memory.

16. The system of claim 12, wherein the cache controller sets the fill mode flag to the first value responsive to the processing unit exiting a sleep state.

17. The system of claim 14, wherein while operating in the first mode, the cache controller is to:
allocate a first cache line in the cache memory for receiving the first portion;
initialize the first cache line to a predetermined value; and
store the first portion in the first cache line.

18. The system of claim 17, wherein while operating in the second mode, the cache controller is to:
allocate a second cache line in the cache memory for receiving the second portion;
retrieve previous values of the second cache line from a memory hierarchy associated with the processing unit; and
store the second portion in the second cache line.

19. The system of claim 11, further comprising a power management controller to:
place the processing unit into a sleep state, wherein the cache controller is to flush the architectural state data from the cache memory to a lower level of a memory hierarchy associated with the processing unit prior to the processing unit entering the sleep state; and
exit the processing unit from the sleep state, wherein the cache controller is to retrieve the architectural state data from the memory hierarchy and the processing unit is to load the retrieved architectural state data.

* * * * *